US 6,554,117 B2

(12) United States Patent
Henson et al.

(10) Patent No.: US 6,554,117 B2
(45) Date of Patent: Apr. 29, 2003

(54) CARTRIDGE BEARING INCLUDING A STUB SHAFT AND AN ELECTRICALLY CONDUCTIVE AXLE AND METHOD OF USING CARTRIDGE BEARING

(75) Inventors: Mark W. Henson, Danville, KY (US); Michael E. Moser, Hamilton, OH (US); Jonathan Hoole, Chorley (GB); James T. Patrick, Lexington, KY (US)

(73) Assignee: Mathews Conveyor, Inc., Danville, KY (US)

( * ) Notice: Subject to any disclaimer, the term of this patent is extended or adjusted under 35 U.S.C. 154(b) by 44 days.

(21) Appl. No.: 09/949,547

(22) Filed: Sep. 10, 2001

(65) Prior Publication Data

US 2003/0047414 A1 Mar. 13, 2003

(51) Int. Cl.$^7$ ............................................. B65G 13/00
(52) U.S. Cl. ........................................ 193/37; 193/35 B
(58) Field of Search ............................. 193/37, 35 R, 193/35 B; 198/957

(56) References Cited

U.S. PATENT DOCUMENTS

| | | | |
|---|---|---|---|
| 3,353,644 A | 11/1967 | McNash et al. | |
| 3,610,387 A | 10/1971 | Von Stein | |
| 4,059,180 A * | 11/1977 | Krivec et al. | 193/37 |
| 4,113,328 A * | 9/1978 | Vander Meulen | 308/190 |
| 4,196,805 A * | 4/1980 | Banno | 198/827 |
| 4,523,674 A * | 6/1985 | Haugen et al. | 198/843 |
| 4,664,243 A | 5/1987 | Martin | |
| 5,027,940 A * | 7/1991 | Woodward | 198/821 |
| 5,421,442 A | 6/1995 | Agnoff | |
| 5,645,155 A * | 7/1997 | Houghton | 193/37 |
| 5,678,676 A | 10/1997 | Pierson | |
| 5,857,554 A * | 1/1999 | Toye | 193/35 R |
| 5,865,290 A | 2/1999 | Scott | |
| 5,875,878 A | 3/1999 | Pierson | |
| 6,016,900 A * | 1/2000 | Longrod | 193/37 |
| 6,053,298 A | 4/2000 | Nimmo et al. | |
| 6,076,647 A | 6/2000 | Agnoff | |
| 6,098,776 A * | 8/2000 | Schiering | 193/37 |
| 6,161,673 A * | 12/2000 | Nimmo et al. | 193/37 |
| 6,454,077 B2 * | 9/2002 | Nimmo et al. | 193/37 |
| 6,481,564 B2 * | 11/2002 | Kalm | 193/35 R |

* cited by examiner

Primary Examiner—Douglas Hess
(74) Attorney, Agent, or Firm—Kenneth F. Pearce

(57) ABSTRACT

The invention is particularly useful for coacting with roller tubes of conveyor apparatus. A cartridge bearing including a stub axle with a tip of greater hardness than the surface circumscribing the aperture receiving the stub axle is inserted into an end of a conveyor roller tube. Along with being electrically conductive, the stub axle can be provided with a damper for reducing vibration. The stub axle engages an electrically conductive stub shaft and moves axially with respect to the stub shaft to operatively interlock with the aperture of the fixed structure. Use of the cartridge bearing provides for the grounding of static charge that can accumulate during operation of conveyor roller tubes.

33 Claims, 8 Drawing Sheets

CARTRIDGE BEARING INCLUDING A STUB SHAFT AND AN ELECTRICALLY CONDUCTIVE AXLE AND METHOD OF USING CARTRIDGE BEARING

BACKGROUND OF THE INVENTION

1. Field of the Invention

The present invention relates to stub axles and stub shafts that are utilized primarily in combination with cartridge bearings. Generally, the cartridge bearing combination is sized for coacting with an end of conventional roller tubes mounted to conveyor frames. Although the stub axle is retractable, the spring positioned inside the stub shaft normally urges the stub axle toward its corresponding aperture located in the conveyor's frame. Along with being anchored to the stub shaft, the stub axle is also provided with a tip that is harder than the exposed surface circumscribing its corresponding aperture of the frame's fixed structure. The harder tip positioned near the end of the stub axle functionally or operatively interlocks the aperture to reduce scoring of the stub axle caused by operational vibrations of the conveyor. Along with increasing the longevity of the stub axle, the harder tip provides for easier removal of the stub axle from the frame, since the scoring of the stub axle has been reduced. In select embodiments, a nonmetallic damper is located between the stub axle's body and tip for reducing vibration between the stub axle and the conveyor frame.

2. Description of the Previous Art a) U.S. Pat. No. 6,053,298-Nimmo, et. al., discloses a conveyor roller assembly. Roller tube (16) is rotably supported by bearing unit (20) that includes a ball bearing (22) having an outer race confined within an annular adapter bushing (24) molded of a rigid plastics material such as polypropylene and reinforced with glass fibers. A hexagonal stub shaft (60) is also molded of the same plastic material as the bushing. Each stub axle (60) is normally retained in its outwardly projecting position by a coil spring (68) located within shaft (35). The shaft member (35) defines an internal hexagonal chamber (52) and a slightly smaller hexagonal bore (54) with the collapsible outer portion of the shaft member. Additionally, the stub axle (60) has a twisted and tapered outer tip portion (62) with a hexagonal outer end surface (63). Nimmo's rigid plastics material includes sufficient carbon particles to allow for dissipation of electrostatic charge.

b) U.S. Pat. No. 4,421,442-Agnoff describes a conveyor roller tube that has a tapered shuttle for engaging the conveyor's frame. A roller (10) is mounted between the frame members (12) via an axially moveable shuttle (30) at the ends of the roller shaft (18). The shuttle (30) is adapted to engage its corresponding mounting hole (14) in the frame. Agnoff's shuttle body (32) slides freely within the roller shaft (18) and has a polygonal tapered end portion (34) that is narrower the body (32) so that a shoulder (36) is created for engaging snap ring (38). Springs (42) always bias shuttles (30) toward their corresponding mounting holes (14). And in Column, lines 59–64, Agnoff declares, "The combination of the spring 42 and the tapered end 34 of the shuttle eliminates any play between the shuttle 30 and the mounting hole 14. As a result, vibration and movement of the roller shaft 18 is substantially reduced."

c) U.S. Pat. No. 5,865,290-Scott enables a conveyor roller insert. Scott's cartridge has an outboard bearing (50) and inboard bearing (64). A stub axle (28) having a hex-shaped tip (30) is positioned axially within the cartridge (12) and roller tube (14). The tip (30) has a tapered portion (32) and projects outwardly from the cartridge (12) for inserting into a corresponding mounting hole (34). Scott incorporates a coil spring (40) for biasing the stub axle (28) into its corresponding mounting hole (34).

d) U.S. Pat. No. 6,076,647-Agnoff discloses a stub shaft conveyor roller. The roller tube (20) is journaled on a pair of stub shafts (50). Agnoff's stub shaft (50) and bearing shield (40) are biased by a spring (60) to an extended position. Among other things, stub shaft (50) includes a cylindrical inner portion (52) journaled in bearing (38) and an outer hexagonal portion (54) adapted to mate with a similarly sized opening (14) of the mounting frame (12). Agnoff's outer portion (54) also has a threaded hole (58) for receiving a bolt (62) which extends from outside the frame (12) into the hole.

e) U.S. Pat. No. 4,664,243-Martin enables a polymeric conveyor roller, a polymeric spherical bearing and a spring loaded retractable shaft.

f) U.S. Pat. No. 5,678,676-Pierson, among other things, teaches a method and apparatus for utilizing bushings to attach a conveyor roller rotably mounted on a through shaft to the conveyor frame. The bushing (36) is slipped over the end of shaft (14) and the tapered outer surface (41) of the tapered legs (40) are squeezed together to grip the roller shaft as it is inserted to the conveyor frame. When the bushing's latches (39) and latching legs (38) are pressed through the hole, the latches (39) catch on the inner side (43) of the frame member to hold the bushing in place. The gripping action of the tapered leges (40) on the roller shaft greatly reduces vibration, and the bushing (36) eliminates the metal on metal contact between the shaft (14) and the mounting hole (22). In another embodiment, Pierson attaches a plastic cone (35) onto the roller shaft (14). And in yet another embodiment, the '063 Patent discloses biasing the tapered end of the through shaft (14) into mounting hole (22) to reduce vibration of the shaft (14) in both mounting holes (22) and (32).

g) U.S. Pat. No. 5,875,878-Pierson is a Patent that issued from the divisional application from which U.S. Pat. No. 5,678,676-Pierson also issued.

h) U.S. Pat. No. 3,353,644-McNash, et. al., among other things, enables a conveyor roller formed of plastic components.

i) U.S. Pat. No. 3,610,387-Von Stein enables a conveyor roller. The Von Stein shaft (6) has a blind bore (40) that reciprocates with an axially movable plunger (42). A helical expansion spring (45) is inserted into the blind bore (40) to bias the head (44) of plunger (42) into hole (102) of frame.

SUMMARY OF THE INVENTION

Unlike traditional stub axles for cartridge bearings, the present apparatus includes a tip harder than the surface circumscribing the aperture of the fixed structured into which the stub axle it is to be inserted or a damper or both. Hexagonal and other tapered tips of the stub axle are sized for operatively interlocking with an aperture of the conveyor frame. Both the stub shaft and the stub axle engaging the stub shaft are electrically conductive to assist in grounding the static charge frequently generated by conveyor roller tubes. The cartridge's housing can be supported by a single ball bearing, a ball bearing and a journal bearing, or by two ball bearings. Along with supporting the housing, the bearing or bearings journal the hollow stub shaft. A spring can be inserted into a chamber of the stub shaft to urge the stub axle axially outward and toward its corresponding aperture, and the stub axle can also be provided with an anchor for securing the stub axle.

An object of the present invention is to provide a cartridge bearing for coacting with a conveyor roller tube.

It is another object of the present invention to enable a method of using the cartridge bearing.

Still another object of the present invention is to provide a stub axle having a tip or tip zone with greater hardness than the surface circumscribing the aperture that is operatively interlocked with the stub axle.

Yet another object of the present invention is to provide a stub axle having a damper or damper zone capable of reducing vibration associated with conveyor rollers.

Still another object of the present invention is to provide an axially movable electrically conductive axle.

Yet still another object of the present invention is provide a metallic axially movable electrically conductive axle.

It is yet another object of the present invention to provide a nonmetallic axially movable electrically conductive axle.

Still another object of the present invention is to provide an axially movable electrically conductive axle that is part metallic and part nonmetallic.

An embodiment of the present invention can be described as a spring-assisted axially movable electrically conductive axle extending outwardly from a hollow shaft journaled in a bearing for operatively interlocking an aperture of a fixed structure comprising: a body engaging the hollow shaft with a tip projecting outwardly from the hollow shaft for operatively interlocking with the aperture, wherein the tip is harder than the exposed surface of the aperture and a nonmetallic damper positioned between said tip and said body.

Another embodiment of the present apparatus can be described an insertable cartridge coacting with a tube, comprising: a housing; a bearing supporting the housing and journaling the stub shaft; a spring for urging an axially movable electrically conductive axle into an operative interlocking with an aperture of a frame, wherein the axially movable electrically conductive axle further includes: a body engaging the stub shaft and a tip projecting outwardly from the stub shaft for operatively interlocking with the aperture and a nonmetallic damper positioned between said tip and said body.

Yet another embodiment of the present device can be described as an insertable cartridge coacting with a conveyor roller tube, comprising: a housing; an inboard bearing and an outboard ball bearing supporting the housing and journaling a stub shaft; a spring for urging an axially movable electrically conductive axle into an operative interlocking with an aperture of a conveyor frame, and wherein the axially movable electrically conductive axle further includes: a body engaging the stub shaft, a tapered tip projecting outwardly from the stub shaft for operatively interlocking with the aperture and a nonmetallic damper positioned between the tapered tip and the body.

In still another embodiment, the present invention can be described as an insertable cartridge coacting with a conveyor roller tube, comprising: a housing; an inboard ball bearing and an outboard ball bearing supporting the housing and journaling a stub shaft having a chamber including a spring for urging an axially movable electrically conductive axle into an operative interlocking with an aperture, and wherein the axially movable electrically conductive axle further includes: a metallic body engaging the electrically conductive nonmetallic stub shaft and a metallic hexagonal tapered tip projecting outwardly from the stub shaft for operatively interlocking with the aperture of said frame such that the metallic tapered tip of the axially movable electrically conductive axle is harder than an exposed surface of the aperture.

Yet still another embodiment can be described as an insertable cartridge coacting with a conveyor roller tube, comprising: a housing; an inboard ball bearing and an outboard ball bearing supporting said housing and journaling a stub shaft having a spring for urging a hexagonal axially movable electrically conductive axle into an operative interlocking with an aperture, wherein the hexagonal axially movable electrically conductive axle further includes: a body engaging the stub shaft and a metallic tapered tip harder than an exposed surface of the aperture projecting outwardly from the stub shaft for operatively interlocking with the aperture and a nonmetallic damper positioned between the tapered tip and the body.

Still another embodiment of the present invention can be described as a method of operatively interlocking a tip of an electrically conductive axle to an aperture of a conveyor frame for reducing vibration and noise of a conveyor roller, comprising the steps of: inserting a cartridge including a ball bearing into an end of a conveyor roller; supporting the cartridge from said ball bearing; journaling a stub shaft in the ball bearing; loading a spring into the stub shaft for urging said electrically conductive axle body toward said aperture; incorporating a tip on said electrically conductive axle body, wherein said tip is harder than an exposed surface of said conveyor's frame circumscribing said aperture; positioning a damper between the tip and the electrically conductive axle body; and operatively interlocking the tip of said electrically conductive axle body with the aperture.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

Figure 1:
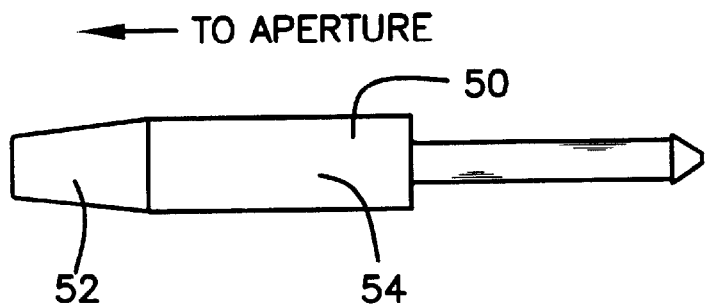
FIG. 1 is a representation of an embodiment of a stub axle having two zones, within the scope of the present invention.

FIG. 1 depicts a simplified embodiment of an all metallic stub axle of the present invention that is subdivided into two zones. Stub axle (50) is divided into tip zone (52) and body zone (54). Body zone (54) is of a lesser hardness than tip zone (52) which is of greater hardness than the aperture of the fixed structure (not shown) into which stub axle (50) is to be inserted.

Figure 2:
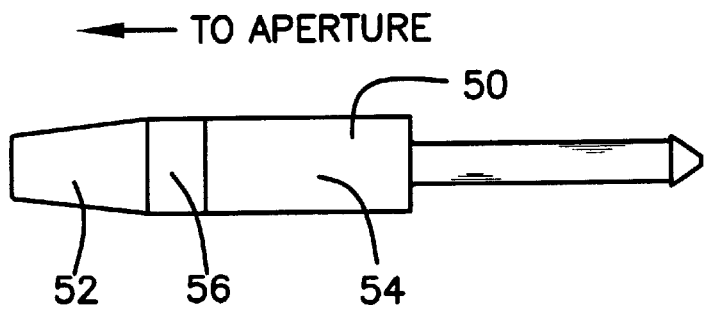
FIG. 2 is another representation of a stub axle having three zones, within the ambit of the present invention.

FIG. 2 portrays another simplified embodiment of the stub axle that has been divided into three zones. As shown, stub axle (50) includes tip zone (52), body zone (54) and damper zone (56). Within the ambit of the present invention, zones (52), (54) and (56) can be composed as follows:

a) zones (52), (54) and (56) are nonmetallic; or b) zone (52) is metallic and zones (54) and (56) are nonmetallic; or c) zone (52) and (56) are metallic and zone (54) is nonmetallic.

Regardless of the composition of the respective zones (52), (54) and (56), tip zone (52) has a hardness greater than the aperture of the fixed structure (not shown) into which stub axle (50) is to be operatively inserted while body zone (54) is of lesser hardness than tip zone (54). In this specific embodiment, when stub axle (50) is operatively interlocked with an aperture, damper zone (56) is resilient enough to absorb some of the shock generated between the stub axle and the conveyor frame (not shown).

Figure 3:
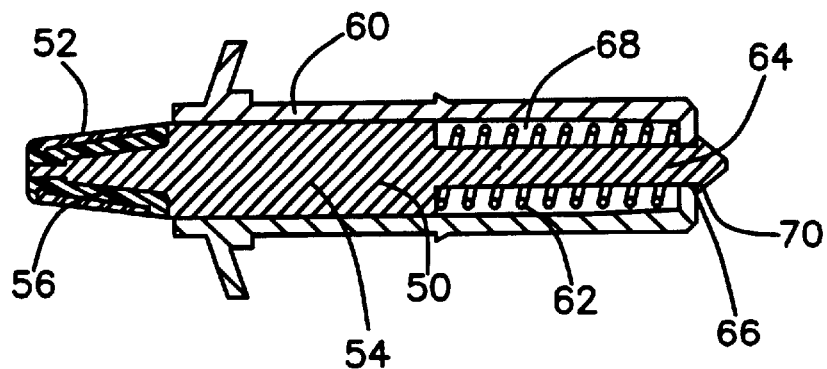
FIG. 3 is a lateral view of a stub axle engaging the stub shaft, in accordance with the present invention.

In FIG. 3, an embodiment of the present invention utilizing stub axle (50) including tip (52), body (54) and damper (56) that has been inserted into hollow stub shaft (60) is disclosed. Body (54) engages stub shaft (60) while tip (52) projects outwardly from hollow stub shaft (60) for operatively interlocking with an aperture of the fixed structure (not shown), such as, a conveyor frame. Positioned between tip (52) and body (54) is damper (56), and as shown, tip (52) is tapered. As enabled in FIGS. 1 and 2, tip zone (52) and damper zone (56) can be fabricated into a sole stub axle (50), including tip (52), body (54) and damper (56). However, those skilled in the art recognize that stub axle (50) can be dimensioned such that tip (52), or tip (52) and damper (56), are secured as separate components to body (54) of stub axle (50).

Anchor (64) securing stub axle (50) is shouldered in inboard end (66) of hollow stub shaft (60). Hook (70) of anchor (64) securely engages inboard end (66) of hollow stub shaft (60) that is external to chamber (68). Spring (62) is positioned in chamber (68) of hollow stub shaft such that stub axle (50) is urged axially outwardly from hollow stub shaft (60).

Figure 4:
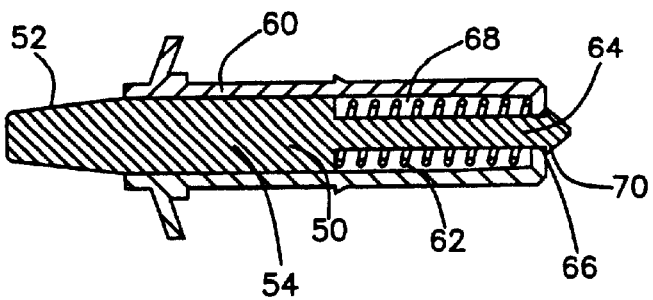
FIG. 4 is lateral view of another embodiment of the stub axle engaging the stub shaft of the present invention.

In FIG. 4, an all metallic stub axle (50) embodiment including tapered tip (52), body (54), anchor (64) and hook (70) is depicted. Body (54) of stub axle (50) engages hollow stub shaft (60) while tapered tip (52) projects outwardly from hollow stub shaft (60) for operatively interlocking with an aperture of the conveyor frame (not shown). Spring (62) is positioned in chamber (68) of hollow stub shaft such that stub axle (50) is urged axially outwardly from hollow stub shaft (60). Anchor (64) secures stub axle (50) and is shouldered in inboard end (66) of hollow stub shaft (60) while hook (70) of anchor (64) securely engages inboard end (66) of hollow stub shaft (60) that is external to chamber (68). As shown in FIG. 4, stub axle (50) is a sole axle including tip zone (52) and body zone (54). However, those skilled in the art recognize that stub axle (50) can be dimensioned such that tip (52) is a separately secured component of stub axle (50).

Figure 5:
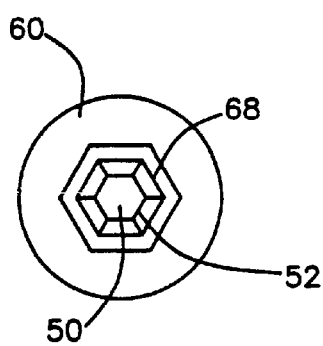
FIG. 5 is a frontal view of the stub axle engaging the stub shaft, within the scope of the present invention.
Figure 6:
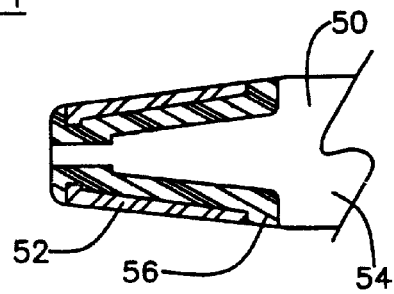
FIG. 6 is a representation of a hexagonal tip of the stub axle having a separately attached tip and damper.

In FIG. 5, a frontal axial view of an embodiment of the present invention including a hexagonal tapered tip (52) for operative insertion into the aperture of the conveyor frame is set forth. Stub axle snugly engages chamber (68) of hollow stub shaft (60), thereby reducing vibration associated with conveyor rollers. In yet another embodiment, as shown in FIG. 6, stub axle (50) includes hexagonally tapered tip (52) and damper (56) that have been separately attached to body (54) where tapered tip (52) and damper (56) have been sized for operative insertion into the aperture of the conveyor frame (not shown).

As previously indicated, whether metallic or nonmetallic, tapered tip (52) has a greater hardness than the corresponding aperture of the conveyor frame (not shown) into which it is operatively inserted. It has been unexpectedly determined that tips of such hardness reduce scoring of their corresponding axles as well as enhance operative interlocking with their corresponding apertures. In other words, in accordance with the present invention, stub axles seat into the conveyor frame rather than wear away from the conveyor frame.

Figure 7:
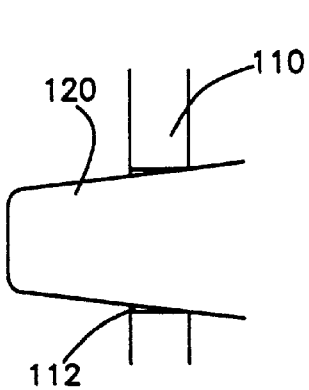
FIG. 7 is lateral view showing a relationship between the tip of a stub axle and the frame, when the tip is initially inserted in the aperture.
Figure 8:
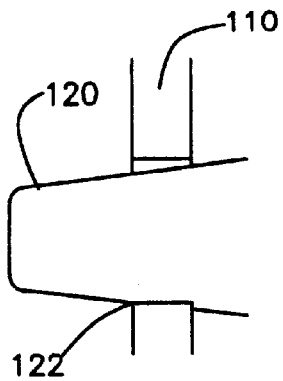
FIG. 8 is lateral view showing a the scoring of the tip of a traditional stub axle.
Figure 9:
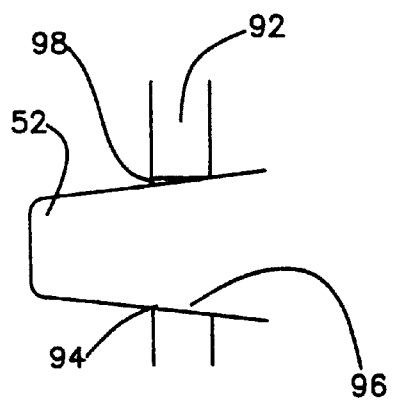
FIG. 9 is lateral view showing an operative interlocking of the present stub axle with the corresponding aperture of a frame.

As is well known in the art, FIG. 7 portrays an interlocking between tip (120) and frame (110), when the tip (120) is initially inserted into aperture (112) of frame (110). Prior to the current invention that incorporates the hardened tip zone and as portrayed in FIG. 8, operation of the conveyor roller resulted in the harder frame (110) scoring the softer tip (120) along area (122). However, as depicted in FIG. 9 and in accordance with the present invention, after use of the conveyor roller, aperture (94) of frame (92) conforms to the structure of hardened tip (52) of stub axle (50). Thus, as shown in FIG. 9, hardened tip (52) can operatively interlock along scoring area (96) while simultaneously leaving clearance (98) between aperture (94) and tip (52).

Figure 10:
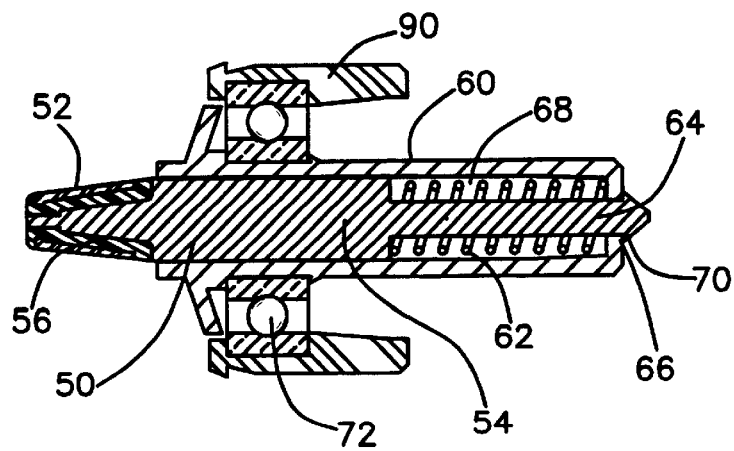
FIG. 10 is a top view cut away of an extended stub axle embodiment of the present invention.

With a view toward FIG. 10, another embodiment of the current invention is shown. Ball bearing (72) supports housing (90) and journals stub shaft (60). Housing (90) is a plastic or a plastic-like composition while stub shaft (60) is formed of plastic. Plastics incorporated into the present invention further include the capability of assisting in the grounding of static charge generated by the conveyor roller tubes.

Figure 11:
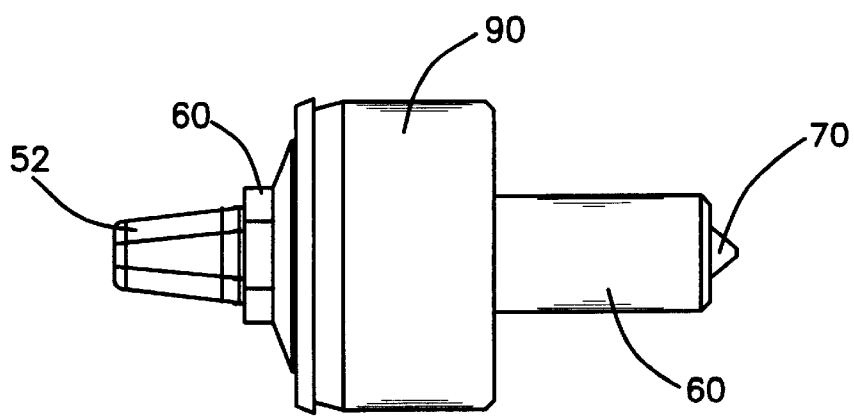
FIG. 11 is an external view of the cartridge bearing, within the scope of the present invention.

As depicted in FIG. 11, hollow shaft (60) extends axially through housing (90). Tapered tip (52) protrudes outwardly from hollow shaft (60) on the outboard side of housing (90) while hook (70) of anchor (64) is attached to inboard end (66) of stub shaft (60) on the inboard side of housing (90). In operation, housing (90) can be inserted into the end of a conveyor roller tube.

Returning to FIG. 10, body (54) of stub axle (50) engages hollow stub shaft (60) while tapered tip (52) and damper (56) project outwardly from hollow stub shaft (60) for operatively interlocking with an aperture of the conveyor frame. Although FIG. 10 depicts separately attached tapered tip (52) and damper (56), stub axle (50) can also be constructed in any of the previously identified configurations and still function within the scope of the present invention. Spring (62) is positioned in chamber (68) of hollow stub shaft (60) such that stub axle (50) is urged axially outwardly from hollow stub shaft (60) while anchor (64) secures stub axle (50). Anchor (64) is shouldered in inboard end (66) of hollow stub shaft (60) while hook (70) of anchor (64) securely engages inboard end (66). Anchor (64) can be attached to body (54) or anchor (64) can be manufactured as an extension of body (54). Thus, anchor (64) can be of a different composition than body (54).

Figure 12:
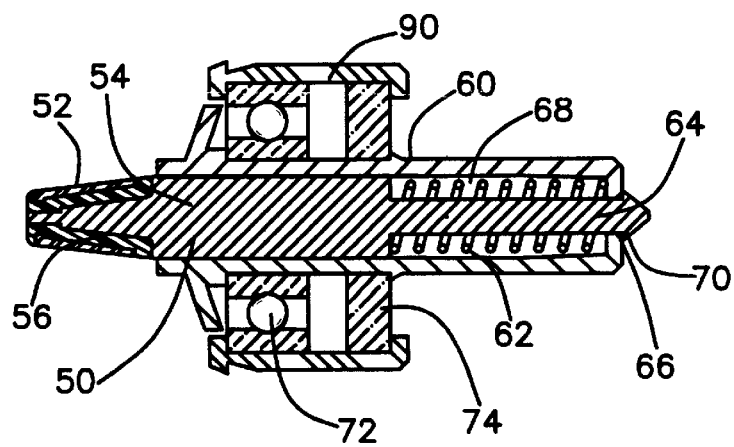
FIG. 12 is a top view cut away of another extended stub axle embodiment of the present invention.

In FIG. 12, another embodiment of the present invention is disclosed. With the exception of inboard journal bearing (74) and now outboard ball bearing (72) that support housing (90) and journal stub shaft (60), the remaining elements associated with stub axle (50) are identical to those previously set forth in the description devoted to the embodiment exemplified in FIG. 10.

Figure 13:
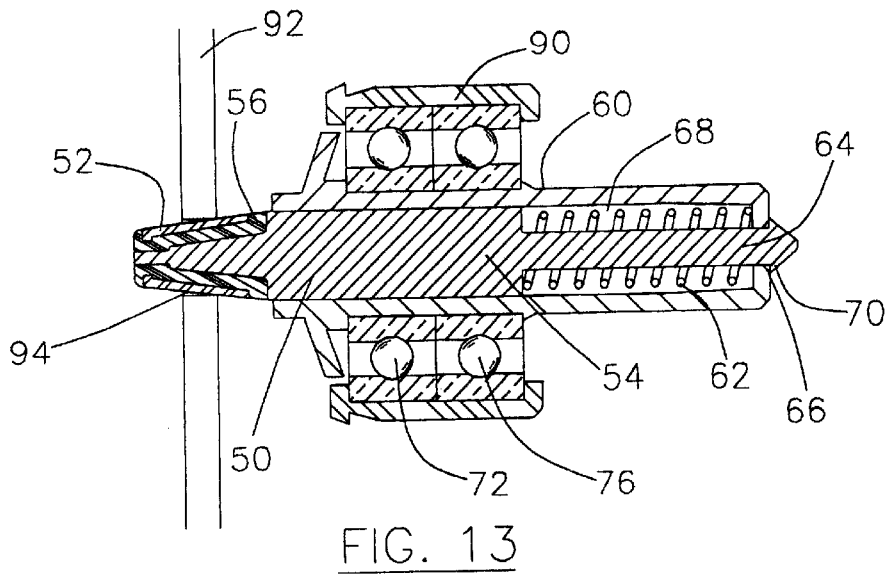
FIG. 13 is a top view cut away of an operatively interlocked embodiment of the present invention.

In a similar vein, yet another embodiment of the current invention is portrayed in FIG. 13. As shown, tapered tip (52) of stub axle (50) is operatively interlocked with aperture (94) of conveyor frame (92). Those skilled in the art recognized that the previously set forth embodiments can also operatively interlock with an aperture of a fixed structure in a similar manner. With the exception of inboard ball bearing (76) and now outboard ball bearing (72) that support housing (90) and journal stub shaft (60), the remaining elements associated with stub axle (50) are identical to those previously set forth in the description devoted to the embodiments exemplified in FIGS. 10 and 12.

Figure 14:
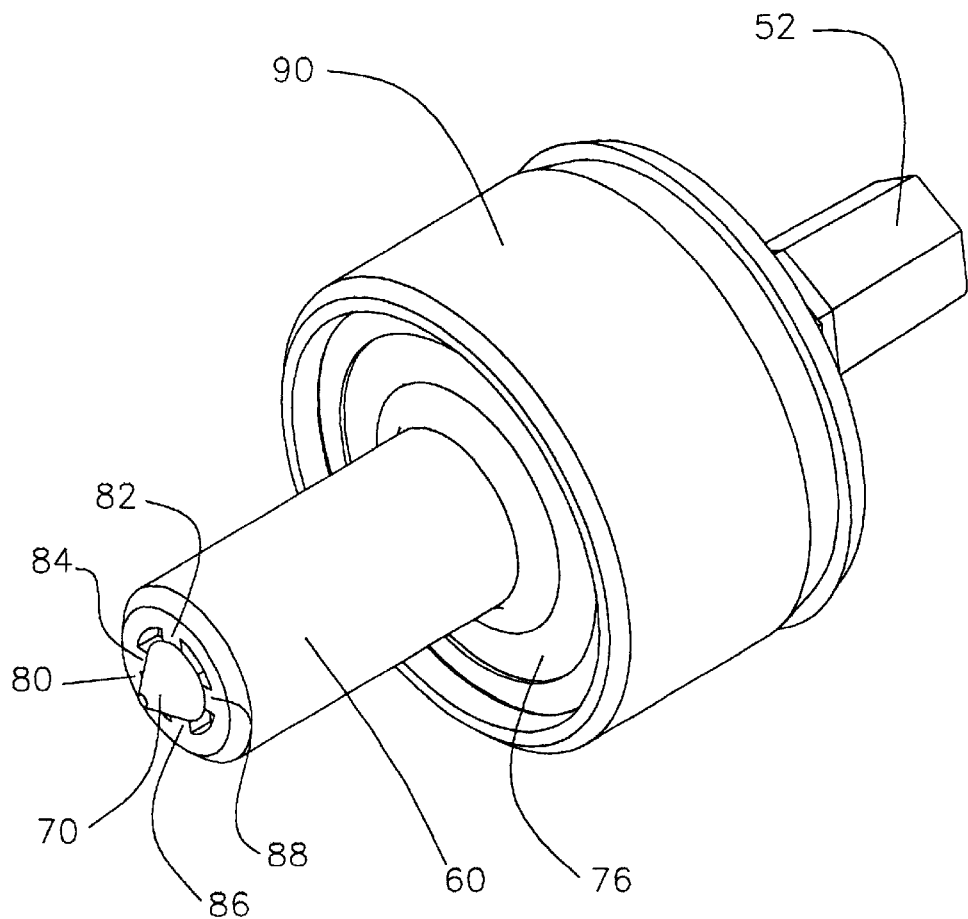
FIG. 14 is an inboard end pictorial of an embodiment incorporating the detent of the present invention.
Figure 15:
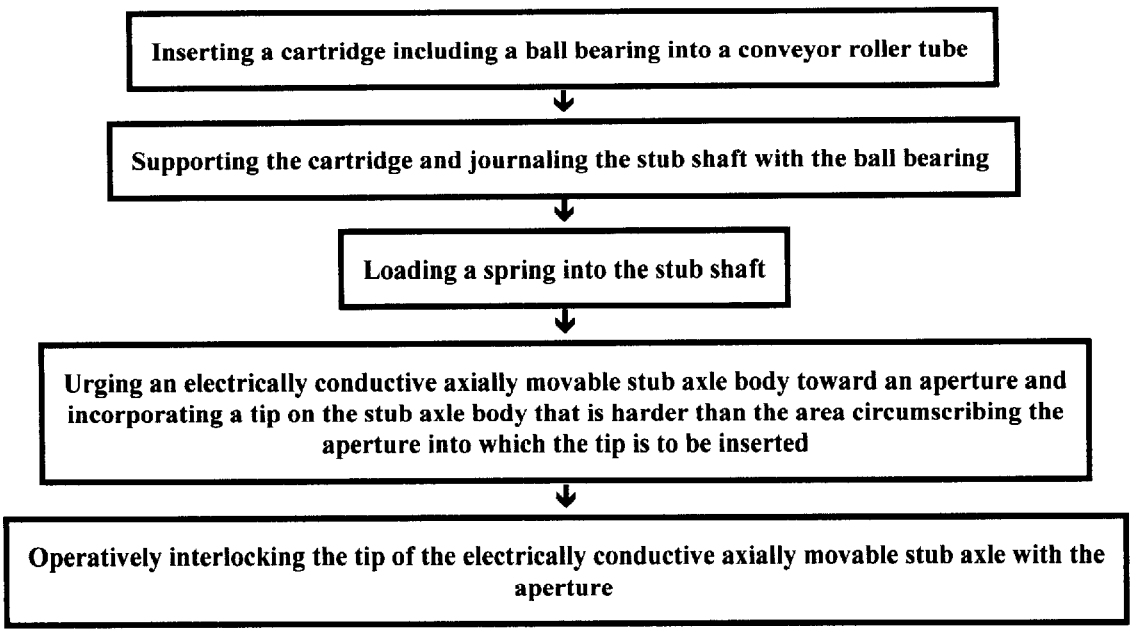
FIG. 15 is an illustration of the steps of an embodiment of the present method.
Figure 16:
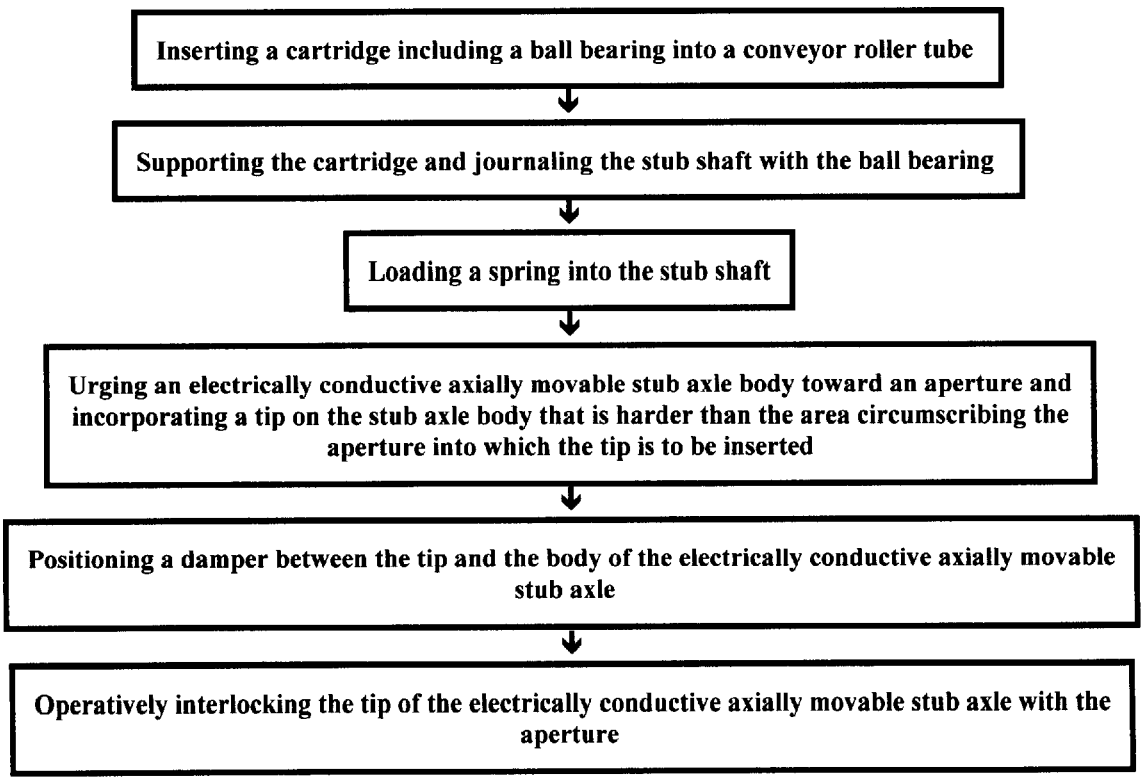
FIG. 16 is a depiction of the steps of another embodiment of the present invention.
Figure 17:
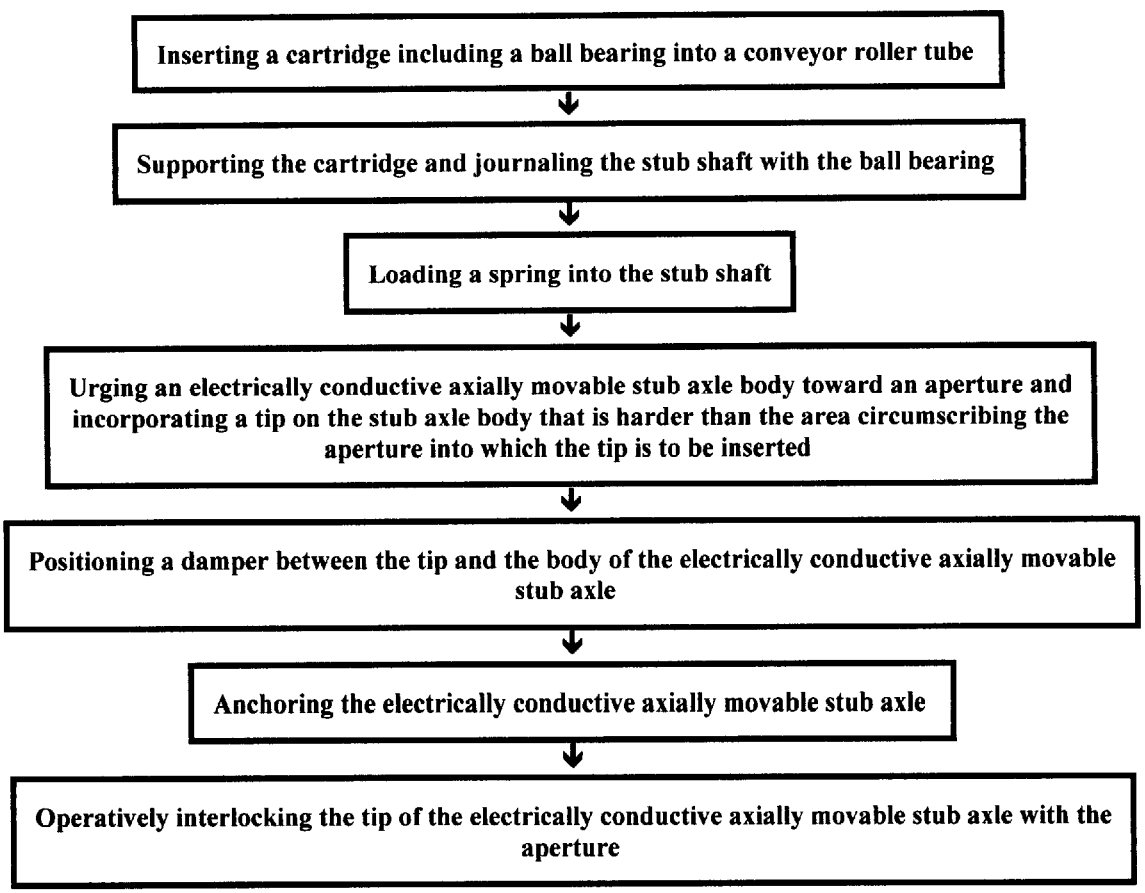
FIG. 17 is an exemplification of the steps of yet another embodiment of the current method.
Figure 18:
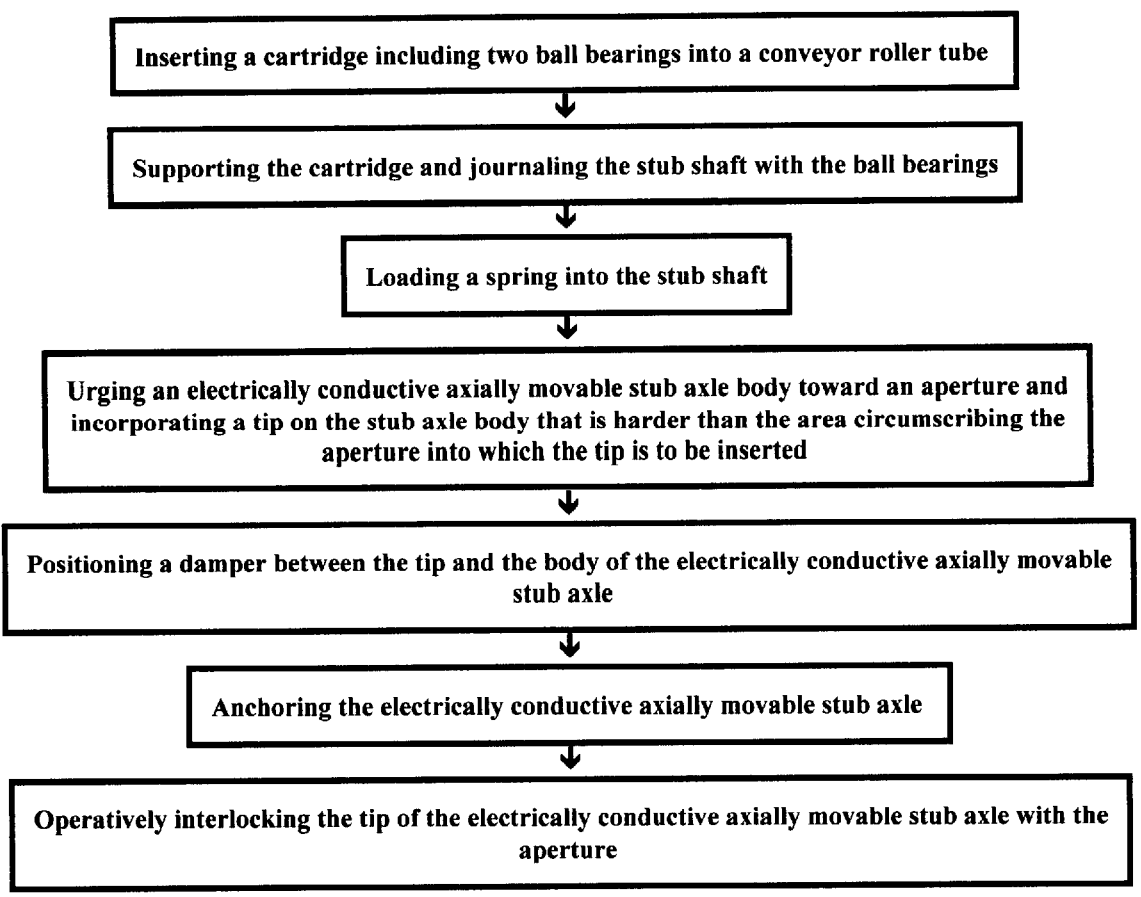
FIG. 18 is a diagrammatic representation of the steps of still another embodiment of the present invention.
Figure 19:
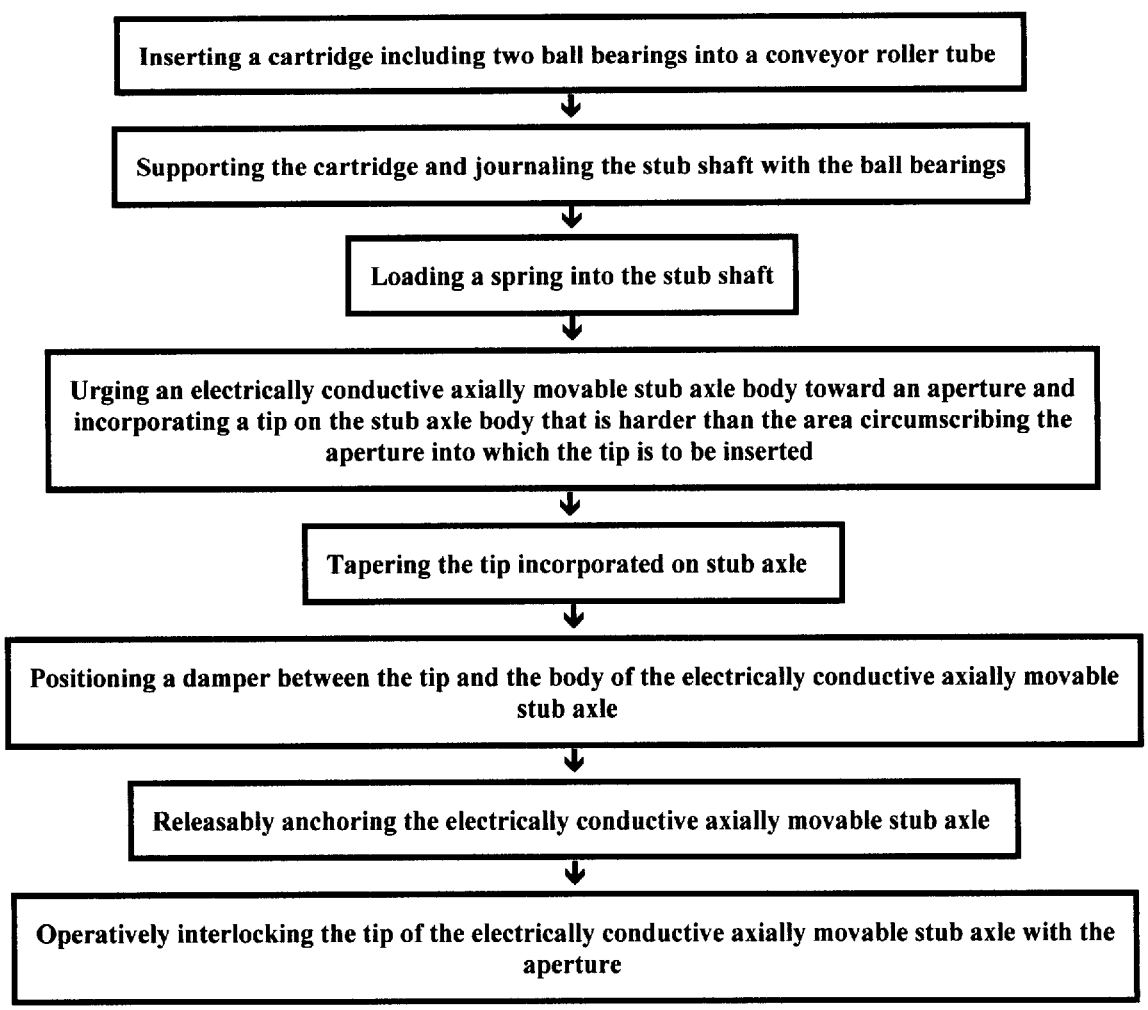
FIG. 19 is an illustration of the steps of yet another embodiment of the present method.

FIG. 14 is an inboard end pictorial of an embodiment of incorporating detent (80). Arms (82, 84, 86 and 88) extend inwardly from stub shaft (60) to releasably catch hook (70) of anchor (64). In this specific embodiment, detent (80) is a plastic composition, but those skilled in the art recognize that other compositions can also be utilized, as well as that detent (80) can also be incorporated to other embodiments previously set forth. Because of detent (80), when adequate force is applied to tip (52) of stub axle (50), stub axle (50) can be pulled from stub shaft (60) while stub shaft (60) remains journaled in, for example, ball bearings (76 and 72).

Steps associated with the practice of the methods of present invention utilizing select structural elements enabled above are set forth in FIGS. 15–19. Having disclosed the invention as required by Title 35 of the United States Code, Applicants now pray respectfully that Letters Patent be granted for their invention in accordance with the scope of the claims appended hereto.

What is claimed is:

1. A spring-assisted axially movable electrically conductive axle extending outwardly from a hollow shaft journaled in a bearing for operatively interlocking an aperture of a fixed structure; said spring-assisted axially movable electrically conductive axle, comprising:
   a) a body engaging said hollow shaft;
   b) a tip projecting outwardly from said hollow shaft for operatively interlocking with said aperture of said fixed structure, wherein said tip is harder than an exposed surface of said fixed structure circumscribing said aperture; and
   c) a nonmetallic damper positioned between said tip and said body.

2. The invention of claim 1 wherein said tip of said axially movable electrically conductive axle is metal.

3. The invention of claim 2 wherein said body of said axially movable electrically conductive axle is metal.

4. The invention of claim 2 wherein said body of said axially movable electrically conductive axle is not metal.

5. An insertable cartridge coacting with a tube, comprising:
   a) a housing;
   b) a first bearing supporting said housing and journaling a stub shaft;
   c) said stub shaft further including a spring for urging an axially movable electrically conductive axle into an operative interlocking with an aperture of a frame, and
   d) said axially movable electrically conductive axle further comprising:
      i) a body engaging said stub shaft;
      ii) a tip projecting outwardly from said stub shaft for operatively interlocking with said aperture of said frame; and
      iii) a nonmetallic damper positioned between said tip and said body.

6. The invention of claim 5 wherein said tip of said axially movable electrically conductive axle is tapered.

7. The invention of claim 6 further comprising a second bearing supporting said housing and journaling said stub shaft.

8. The invention of claim 7 wherein said first bearing and said second bearing are ball bearings.

9. The invention of claim 8 wherein said tip of said axially movable electrically conductive axle is harder than an exposed surface of said frame's structure circumscribing said aperture.

10. The invention of claim 9 further comprising an anchor.

11. The invention of claim 10 further comprising a detent for said anchor.

12. The invention of claim 11 wherein said tip of said axially movable electrically conductive axle is metal.

13. The invention of claim 11 wherein said body of said axially movable electrically conductive axle is metal.

14. The invention of claim 11 wherein said body of said axially movable electrically conductive axle is not metal.

15. An insertable cartridge coacting with a conveyor roller tube, comprising:
   a) a housing;
   b) an inboard bearing supporting said housing and journaling a stub shaft
   c) an outboard ball bearing supporting said housing and journaling said stub shaft;
   d) said stub shaft further including a spring for urging an axially movable electrically conductive axle into an operative interlocking with an aperture of a conveyor frame, and
   e) said axially movable electrically conductive axle further comprising:
      i) a body engaging said stub shaft;
      ii) a tapered tip projecting outwardly from said stub shaft for operatively interlocking with said aperture of said frame; and iii) a nonmetallic damper positioned between said tapered tip and said body.

16. The invention of claim 15 wherein said tapered tip of said axially movable electrically conductive axle is hexagonal.

17. The invention of claim 16 wherein said inboard bearing is a ball bearing.

18. The invention of claim 17 wherein said tapered tip of said axially movable electrically conductive axle is harder than an exposed surface of said conveyor's frame circumscribing said aperture.

19. The invention of claim 18 further comprising an anchor.

20. The invention of claim 19 further comprising a detent for said anchor.

21. The invention of claim 20 wherein said tapered tip of said axially movable electrically conductive axle is metal.

22. An insertable cartridge coacting with a conveyor roller tube, comprising:
 a) a housing;
 b) an inboard ball bearing supporting said housing and journaling a stub shaft;
 c) an outboard ball bearing supporting said housing and journaling said stub shaft;
 d) said stub shaft further including a chamber having a spring for urging an axially movable electrically conductive axle into an operative interlocking with an aperture of a conveyor frame, and
 e) said axially movable electrically conductive axle further comprising:
  i) a metallic body engaging said electrically conductive nonmetallic stub shaft; and
  ii) a metallic hexagonal tapered tip projecting outwardly from said stub shaft for operatively interlocking with said aperture of said frame, wherein said metallic tapered tip of said axially movable electrically conductive axle is harder than an exposed surface of said conveyor's frame circumscribing said aperture such that said frame rather than said metallic tapered tip encounters wearing from vibrations of said conveyor roller tube.

23. The invention of claim 22 wherein said metallic body engaging said electrically conductive nonmetallic stub shaft is hexagonal.

24. The invention of claim 23 further comprising an anchor attached to said axially movable electrically conductive axle.

25. The invention of claim 24 further comprising a detent for said anchor.

26. An insertable cartridge coacting with a conveyor roller tube, comprising:
 a) a housing;
 b) an inboard ball bearing supporting said housing and journaling a stub shaft
 c) an outboard ball bearing supporting said housing and journaling said stub shaft;
 d) said stub shaft further including a spring for urging a hexagonal axially movable electrically conductive axle into an operative interlocking with an aperture of a conveyor frame, and
 e) said hexagonal axially movable electrically conductive axle further comprising:
  i) a body engaging said stub shaft;
  ii) a metallic tapered tip projecting outwardly from said stub shaft for operatively interlocking with said aperture of said frame, wherein said metallic tapered tip is harder than an exposed surface of said conveyor's frame circumscribing said aperture; and
  iii) a nonmetallic damper positioned between said tapered tip and said body.

27. The invention of claim 26 further comprising an anchor attached to said hexagonal axially movable electrically conductive axle.

28. The invention of claim 27 further comprising a detent for said anchor.

29. The invention of claim 28 wherein said body of said hexagonal axially movable electrically conductive axle is not metal and is softer than said metallic tapered tip of said hexagonal axially movable electrically conductive axle.

30. A method of operatively interlocking a tip of an electrically conductive axle to an aperture of a conveyor frame for reducing vibration and noise of a conveyor roller, comprising the steps of:
 a) inserting a cartridge including a ball bearing into an end of a conveyor roller;
 b) supporting said cartridge from said ball bearing;
 c) journaling a stub shaft in said ball bearing;
 d) loading a spring into said stub shaft for urging said electrically conductive axle body toward said aperture of said conveyor frame;
 e) incorporating a tip on said electrically conductive axle body, wherein said tip is harder than an exposed surface of said conveyor's frame circumscribing said aperture;
 f) positioning a damper between said tip and said electrically conductive axle body; and
 g) operatively interlocking said tip of said electrically conductive axle body with said aperture.

31. The method of claim 30 further comprising the step of releasably anchoring said electrically conductive axle body to said stub shaft.

32. The method of claim 31 further comprising the step of including a second ball bearing in said cartridge.

33. The method of claim 32 further comprising the step of tapering said tip.

* * * * *